United States Patent [19]

Spath et al.

[11] Patent Number: 5,103,704
[45] Date of Patent: Apr. 14, 1992

[54] DEVICE FOR THE HORIZONTAL CLAMPING OF A WORKPIECE RESTING ON A MACHINE TABLE OF A VERTICAL SAW

[75] Inventors: Dieter Spath, Sasbachwalden; Armin Stolzer, Renchen; Manfred Ihle, Bühlertal, all of Fed. Rep. of Germany

[73] Assignee: Keuro Maschinenbau GmbH & Co., Achern-Gamshurst, Fed. Rep. of Germany

[21] Appl. No.: 659,600

[22] Filed: Feb. 21, 1991

[30] Foreign Application Priority Data

Mar. 9, 1990 [DE] Fed. Rep. of Germany ....... 4007449

[51] Int. Cl.$^5$ .............................................. B26D 7/02
[52] U.S. Cl. ....................................... 83/452; 83/457; 83/462; 83/466; 83/466.1; 269/203
[58] Field of Search ....................... 83/452, 466, 466.1, 83/794, 810, 457, 462; 269/71, 73, 76, 188, 203, 256

[56] References Cited

U.S. PATENT DOCUMENTS

| | | | |
|---|---|---|---|
| 1,421,370 | 7/1922 | Ashworth | 269/208 X |
| 2,137,113 | 11/1938 | Hobart et al. | 269/198 |
| 2,631,483 | 3/1953 | Swain | 269/256 X |
| 2,788,687 | 4/1957 | Ridge | 269/208 |
| 2,908,319 | 10/1959 | Robar | 269/256 |
| 4,653,371 | 3/1987 | Vancalbergh | 83/464 |

FOREIGN PATENT DOCUMENTS

1777234 8/1971 Fed. Rep. of Germany.
8228675 5/1984 Fed. Rep. of Germany.
3514169 10/1986 Fed. Rep. of Germany.

Primary Examiner—Douglas D. Watts
Assistant Examiner—Kenneth E. Peterson
Attorney, Agent, or Firm—Frishauf, Holtz, Goodman & Woodward

[57] ABSTRACT

The clamping device has a stationary, substantially vertical clamping face (5) for the workpiece, arranged at right angles with respect to the feed direction of the saw band. A movable clamping jaw (8) is horizontally movable with respect thereto, the clamping jaw (8) having a substantially vertical clamping face (9). The movable clamping jaw (8) is formed as a clamping bridge (7), reaching over the machine table. The fixed clamping face (5) also reaches over the machine table, while leaving a passage for the saw band. The ends of the clamping bridge are guided horizontally beside the machine bench, for clampable adjustment perpendicular to the clamping faces (5, 9), the clamping bridge (7) being pivotable on guide blocks (22, 23) slidable on guide rails next to and below the table (2) of the saw, so that the clamping bridge can clamp a workpiece (3) between the clamping faces, by a toggle connection to a handle, or release the movable bridge. Preferably, the clamping bridge, when in released position, can be tilted away from the workpiece and provides an extension of the machine table (2).

21 Claims, 11 Drawing Sheets

DEVICE FOR THE HORIZONTAL CLAMPING OF A WORKPIECE RESTING ON A MACHINE TABLE OF A VERTICAL SAW

FIELD OF THE INVENTION

The present invention relates to a system for releasably clamping a workpiece on a saw table, typically a workpiece support table for a vertical band saw, in such a manner that the workpiece is supported on both sides of the saw band so that, as the workpiece is severed, the severed portions will both be retained in clamped position on the table; and more particularly to such an arrangement which rapidly and simply provides for clamping of the workpiece while, additionally, and optionally, providing safeguards for the operator and permitting extension of the work table if freehand sawing is to be carried out.

BACKGROUND

Most saws, and especially vertical band saws, have a saw table on which the workpiece or workpiece material is resting. The workpiece is clamped against a fixed clamping element, usually having a vertically extending clamping face, positioned transversely to the feed direction of the saw band. A displaceable clamping jaw, also with a vertical clamping face, is then provided to clamp the workpiece against the fixed jaw. The faces need not be precisely vertical; they may have indentations or grooves, as desired; some clamping devices have clamping jaws which extend at a slight inclination with respect to each other, or in which one clamping jaw has a slight inclination with respect to the other. Since such variations from a vertical position are, however, small, the term used herein and in the claims, "essentially vertical" or "substantially vertical" clamping jaw, will be used for simplicity. The clamping devices usually are in the form of vice jaws, in which a horizontally displaceable clamping jaw is arranged on one side of the cutting plane formed by the saw band for displacement, in clamping direction, over the support surface or table of the saw. Thus, the known clamping devices is suitable for the handling of material as a rule of rod form, which is advanced by sections parallel with and between the clamping faces and is clamped for the individual sawing action.

Vertical band saws are also used for what is called freehand sawing, in which the workpiece is presented on the machine bench to the saw band without the use of the mentioned clamping device. A vice hinders free handling of the workpiece material, and even may make freehand sawing impossible.

During cutting, the workpiece is held only on one side of the cutting plane of the saw band, so that the section being cut off is unsecured and/or unguided. To hold the cut-off section, a further clamping jaw arrangement on the far side of the saw band, or the cutting plane, respectively, is needed.

Miter cuts present problems. For different miter angles, the clamping device must each time be longitudinally—with respect to the workpieces—repositioned in order to be placed as closed as possible to the cutting plane. If such different positioning of the clamping device is not possible, then, having regard to the largest possible miter angle, one must put up with a considerable spacing of the clamping device from the cutting plane, which leads to a correspondingly poor retention of the workpiece material in the cutting region.

THE INVENTION

It is an object to provide a workpiece clamping arrangement for a band saw which assures the retention of the workpiece on both sides of the cutting plane, uniformly during the cutting, and also permits free accessibility of the machine bench for freehand sawing.

Briefly, the clamping jaw is formed as a clamping bridge reaching over the machine bench, also reaching over the stationary clamping surface of the machine bench. A passage for the saw band is left free. The two ends of the clamping bridge are guided beside the machine bench for displacement horizontally and perpendicularly to the plane of the clamping faces; the clamping bridge is displaceable on the guides by means of guide elements and is articulated on the guide elements for pivoting about a tilt axis parallel to the clamping face. An adjustable securing and clamping device, operable by a handle, is provided to clamp the bridge in selected positions along the guide elements. The ends of the clamping bridge are so constructed that in one position of the clamping device the pivotal position of the clamping bridge against the workpiece clamps the workpiece, while in another position of the clamping device, the clamping bridge is released from the workpiece material or is tilted away.

The system has the advantage that, due to the formation of the clamping jaw as a clamping bridge reaching over the machine bench, and due to the formation of the stationary clamping face at the same time as the component reaching over the machine bench while leaving a passage free for the saw band, the workpiece material is clamped in firmly on both sides of the cutting plane for normal sawing operation, so that both the supplied material and the material section to be severed are secured, i.e. subjected to defined positions.

According to a feature of the invention, the clamping bridge can be readily removed from the surface of the machine bench, and even used as an extension of the machine bench. This permits freehand sawing without interference by the clamping device.

In accordance with another feature of the invention, the clamping bridge is guided beside the machine bench horizontally displaceably and securably at its two ends, perpendicularly of the plane of the clamping faces. It is pivotable on the guide elements about a tilt axis parallel to the clamping face so that it can be pivoted about this tilt axis after appropriate displacement of the guide elements beyond the region of the machine bench into such a position that its clamping face constitutes a continuation or extension of the surface of the machine bench, that is, a continuation of the workpiece support.

In accordance with yet another feature of the invention, the clamping device is rotatably articulated on the guide elements and on the ends of the clamping bridge in such a way that in one rotary or tilted setting of the clamping device, the clamping bridge clamps the workpiece while in another rotary or tilted setting, the clamping bridge is tilted away from and releases the workpiece.

The clamping bridge firmly clamps against the workpiece. This results in what is called a "deep-drawing" effect, that is, an action or reactive force upon the workpiece in which the clamping face of the movable clamping jaw presses the workpiece against the support face of the machine bench during the clamping operation.

In accordance with a further feature of the invention, the clamping device uses a toggle arrangement having at least two rotatably interconnected lever arms. The free ends of the lever arms are rotatably connected, with the guide elements and with the ends of the clamping bridge, respectively. Only small operating forces applied on the handles result in high clamping forces exerted upon the workpiece material through the clamping bridge and the clamping face connected thereto.

The rotatability or pivotability of the clamping bridge about the tilt axis on the guide elements offers the possibility of hinging the clamping bridge downwards out of its normally vertical position in a movement away from the saw band, so that with appropriate spacing from the saw band by means of the attendant displacement of the guide elements on the guides, the tilt axis will come to lie outside the support face of the machine bench, with respect to the plane of the clamping face. Thus, complete freedom of the working surface of the machine bench for the movement of material pieces results so that these pieces may be sawn freehand. The downwardly hinged clamping bridge advantageously provides an enlargement towards the operator of the working area formed by the machine bench.

Preferably, the handle is formed by a curved hand grip extending parallel to the clamping bridge. In this way the setting of the clamping jaw can be effected by an operator standing in front of the vertical band saw or its work bench, by means of the curved hand grip, by pivoting it about the tilt axis; at the same time, certain safety prerequisites are automatically provided. The curved hand grip normally can be actuated only with both hands; an operator's hand is not free to reach into the working range of the saw band.

Preferably, the clamping bridge is designed to reach over the guide elements, and with side members extending parallel to the guides. The side members can receive the tilt axis.

The toggle levers are so arranged that the lever arms can be brought into or out of the extended position by pins on the handle which extend into their pivot path. Upon movement of the curved hand grip, the pivoting of the toggle lever can be effected by the pins and thus the stressing or release of the clamping bridge in relation to the workpiece to be clamped, is possible in a simple manner; the operating force required is much less than direct manual actuation.

Various arrangements can be used for the guide elements for the clamping bridge, on which this bridge is displaceable. For example, the guides can be guide rails on which the guide elements are displaceable and clampable in any suitable desired manner.

In accordance with a preferred feature, the guide elements are formed as guide blocks which grasp around guide rods extending horizontally and perpendicularly of the clamping faces. The guide blocks are preferably slit open parallel to the guide rods on the side of the tilt axis to form clamp jaws. The tilt axis is formed as clamping screws non-rotatably connected with the handles, for the releasable clamping of the guide blocks on the guide rods, which latter are freely rotatable in one of the clamping jaws and supported axially in the direction towards the other clamping jaw and mounted in the other clamping jaw by threaded engagement.

Due to this construction the guide elements can be clamped and tightened on the guide rods or released by actuation of the handle or the curved hand grip by the pivoting movement that occurs in the course of the workpiece clamping. This is so since, with the pivoting of the handle, the clamping screws are also rotated. The clamping screws are so set and arranged that upon an appropriate pivoting movement of the handle or of the curved hand grip, a firm clamping of the guide elements on the guide rods takes place first, before the toggle lever is being brought into its extended position at the end of the pivoting movement. Thus the workpiece is clamped for the sawing operation, upon appropriate residual pivoting of the clamping bridge.

In the case of the reverse movement of the handle and/or the curved hand grip, the clamping device is first released and/or the toggle lever is brought out of its extended position, whereupon the clamping of the guide blocks on the guide rods is released. By rotation of the clamping screws, the guide blocks are displaceable on the guide rods and thus also, in relation to the clamping bridge. Another position can then be set, for example for a different workpiece of, for example, different cross section.

Preferably, the clamping screws are rotatably mounted with their threaded engagement in the other clamping jaws by means of a threaded sleeve axially adjustable in the respective clamping jaw. Thus, by appropriate actuation of the threaded sleeve, it is possible to pre-set the working position of the clamping screws in relation to the other clamping jaws, so that the working sequence as described above for the clamping of the guide blocks on the guide rods for the one part and the clamping of the clamping bridge in relation to the workpiece for the other part are assured. More especially, it is also possible to correct for wear which can cause inaccuracies in extended use of the apparatus in accordance with the invention.

It is further advantageous to use interposed spring elements for the axial support between clamping screws and the clamping jaws adjacent to the handles. Thus in the course of the above-mentioned extended use no overstressing can occur on the guide blocks in relation to the guide rods, while the clamping force of the guide blocks in relation to the guide rods remains at the force necessary for firm clamping.

The pivotal positions of the lever arms of the toggle levers between extended and unextended positions may be limited by stops protruding into the range of movement of the toggle levers and projecting from the ends of the clamping bridge or the side members thereof. These stops ensure that the toggle lever, when in clamping position, cannot be over-extended beyond its design position. It also ensures that upon opening the clamping device, by moving the toggle lever out of its extend position, the toggle lever cannot assume an angled position deflected too far in relaxation direction.

According to a further feature of the invention, the rotatable articulated attachment of the lever arms of the toggle levers to the guide elements is disengageable and/or withdrawable.

If use is made of this possibility in that the said articulated attachment, which consists as a rule of joint bolts, is withdrawn, then the clamping bridge is in principle freely pivotable about the tilt axis in relation to the guide elements or the guide blocks which form these, so that the clamping bridge can be pivoted completely out of its vertical position downwards away from an imaginary workpiece. If at the same time the clamping bridge is displaced, by appropriate displacement of its guide elements or the guide blocks forming these, sufficiently far away from the saw band, then it can be hinged so far downwards in relation to the operator in front of the machine bench that the machine bench becomes completely free. In this way then the machine bench in an untroubled manner can be available for the manually effected movement of a workpiece for freehand sawing. Thus here the clamping device is basically cleared out of the way, for the stationary clamping face on the access side of the saw band must in any case remain present, because a movement of the workpiece is not possible, or not permissible, behind the plane of the clamping face.

The guides of the clamping bridge are preferably arranged beside the machine bench and beneath the bench surface in such a way that the clamping bridge is pivotable about the tilt axis, with the articulation of the toggle levers to the guide elements, into a position in which its clamping face lies in the surface plane of the machine bench. Thus here, additionally in the sense of the above-discussed pivotability of the clamping bridge, it is ensured that the bridge, in the hinged-down condition, forms an completion or extension of the working face of the machine bench, whereby, specifically with regard to larger workpieces, their handling for freehand sawing is additionally facilitated.

A further expedient development of the object of the invention consists in that the said guides or guide rods are arranged at least indirectly on a machine frame of the vertical band saw. It can then be provided that the guides or guide rods are mounted on the machine frame for axial displacement in the direction of their longitudinal extent and that with regard to this displaceable mounting they are situated in abutment against a stop formed by the machine frame, in a direction away from the clamping jaw, under the action of (optionally adjustable) spring means supported on the machine frame.

Thus it may be assured in a simple manner that in the case of the possible occurrence of excessive clamping forces with the clamping bridge in relation to the workpiece, no overloading occurs especially of the toggle levers and the handle or curved hand grip, as the case may be, taking consideration of the circumstance that here, at the last moment of the clamping movement of the clamping bridge in the direction towards the workpiece, the guide elements or guide blocks are clamped fast on the guide rods and no further possibility of giving way exists in the case of increased clamping forces. This possibility of giving way is thus given by the above-mentioned configuration in that now the guide rods can yield resiliently to the spring force on exceeding of a specific clamping force of the clamping device, while of course this spring force is adjusted so that the adequate clamping force of the clamping bridge against the workpiece is always maintained. This is valid especially also with regard to vibrations which occur during the sawing operation and could take effect with regard to a slackening of the clamping of the workpiece. Such release of the workpiece is prevented by the resilient initial stress of the guide rods.

The vertical band saw presumed for the invention can be of a construction in which it is adjustable, for the sawing operation, to an inclination in the direction towards the workpiece, in order for example, according to the workpiece cross-section present, to render it possible for the saw band to penetrate at the smallest possible cutting point. Such an oblique position of the saw band in relation to the vertical position has the consequence at the end of the working cut that the saw band does not run out parallel to or in the vertical clamping face of the clamping bridge.

Thus for the complete severance of the workpiece it is necessary that the saw band should partially penetrate into the clamping jaw formed on the clamping bridge. Such a process is widely usual per se in sawing machines. In order to provide a suitable facility for this purpose, it is expedient within the scope of the invention that the clamping jaw connected with the clamping bridge is formed, at least on the side comprising the clamping face, by a thick-walled, replaceable wearing section, especially an aluminium, section, and the saw band can readily cut into such an aluminium section, while after a certain utilisation of a clamping jaw of such formation the aluminium section can be replaced by a new piece of material.

In connection with the invention it has further proved expedient for the termination of the operation of the vertical saw band that a substantially horizontally extending actuating arm is possibly pivotably articulated to one of the guide elements or guide block, for the limitation or halting of feed motion for the vertical band saw, and that the actuating arm protrudes in this feed-determined range of movement of the saw band or of a machine part advanceable in the direction towards the workpiece material and receiving the saw band in circulation.

Thus the stopping or limitation of the feed for the saw band is at the same time also connected with the adjustment of the clamping bridge or the guide elements carrying the latter, so that no special further control means are necessary for this purpose. Here the shut-off device, which can also at the same time effect the return of the machine part carrying the saw band in circulation, is independent of which tilted position of the above-described kind the saw band has in relation to the vertical or which pivotal position may also be given to the saw band about a vertical axis lying in the plane of feed motion, in order for example to produce mitre cuts, that is those cuts which extend through the workpiece material at an angle departing from the right angle to the plane of the clamping faces.

The abutment of the machine part on the actuating arm is expediently assured by stop pins arranged on the machine part on both sides of the saw band. This embodiment results in an optimisation of the shut-off operation with regard to different mitre angles set on the vertical band saw, especially to the effect that the clamping jaw of the clamping bridge experiences no detriment by the saw band.

Finally, it may be provided in accordance with the invention that the curved hand grip carries, in the region of the middle of its length, a guard plate parallel to the clamping face of the clamping jaw and upwardly protruding beyond the curved hand grip. Such a guard plate, which preferably consists of transparent material, forms an automatic protective device which prevents the curved hand grip from being grasped at all in the region of the saw band, thus in the region dangerous to the operator, without on the other hand a hindrance being thereby caused with regard to the visibility of the working region of the vertical band saw.

The invention described above as a whole thus offers the possibility of an especially ergonomic and rational manner of working due to the combination of all functions in connection with the clamping of the workpiece material in one actuating element. These functions include the displacement of the clamping bridge, its fastening and release in relation to the workpiece material, the automatic setting of the maximum feed distance of the sawing tool for straight and mitre cuts, taking consideration of perpendicular and inclined band positions, automatic securing of the working region with regard to danger of accident with the clamping bridge in the clamped condition, also good accessibility with the clamping bridge in the released condition for all mitre angles of the sawing tool. Finally the possibility is afforded of having the machine bench freely available for freehand sawing after the clamping bridge has been hinged down or pivoted away out of the region of the machine bench.

DETAILED DESCRIPTION

Figure 1:
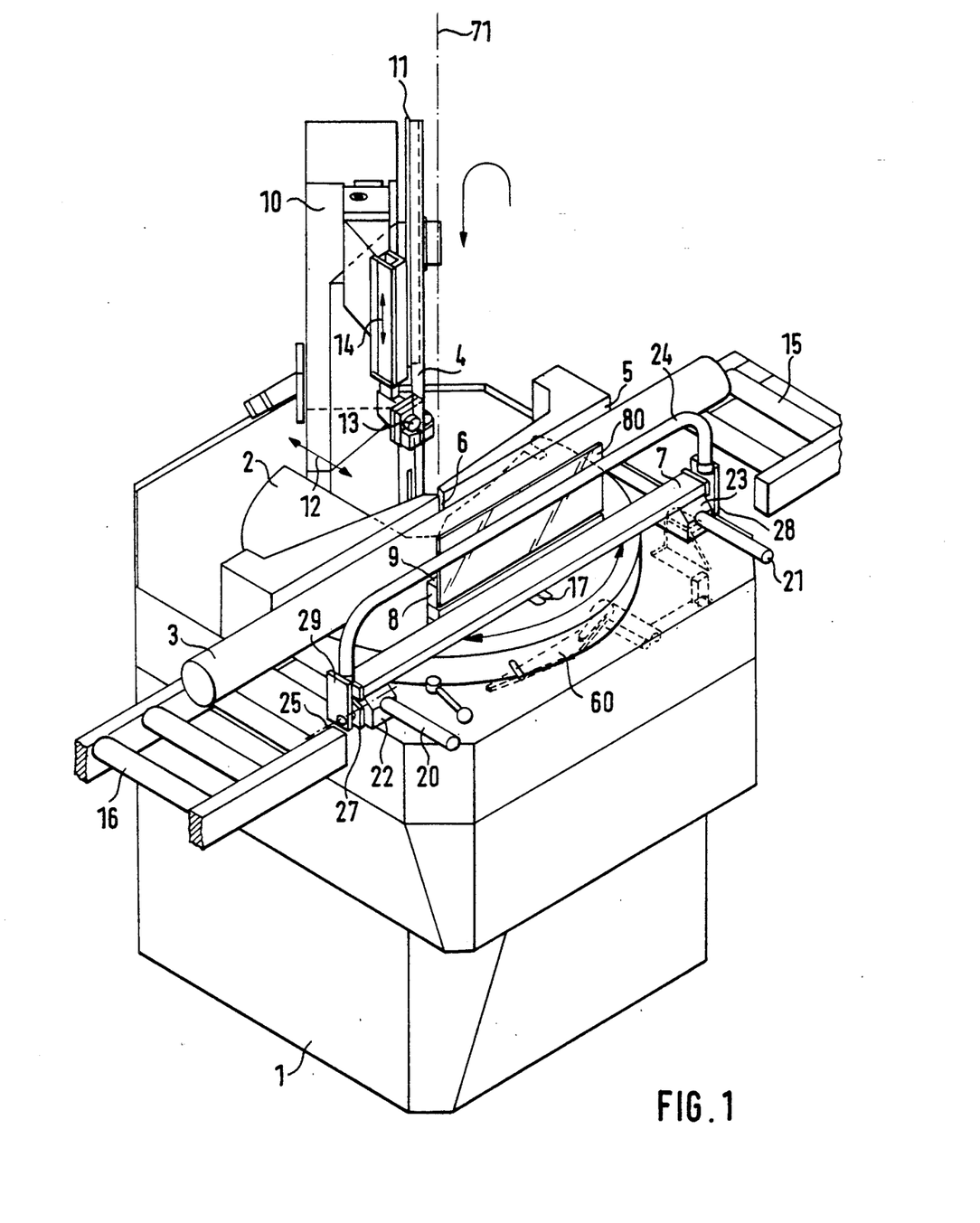
FIG. 1 shows a perspective overall view of a vertical band saw.

FIG. 1 shows in perspective elevation a vertical band saw having a machine frame 1. The machine frame 1 comprises a machine bench 2 in the form of a turntable 2 mounted rotatably on the machine frame 1, on which the workpiece material, material in rod form in the present case, is deposited. For the sawing operation the workpiece material 3 must be clamped on the turntable 2. A stationary clamping surface 5 grasping over the turntable with a passageway 6 for the saw band and, opposite to the clamping face 5, a clamping bridge 7, on which a clamping jaw 8 is fitted to press the workpiece material 3 with its clamping face 9 against the clamping face 5 serve for this purpose on the access side of a saw band 4.

The saw band 4 runs over tail wheels mounted rotatably on a machine part 10 that is horizontally displaceable in the direction towards the workpiece material 3, of which the tail wheel 11 situated above the plane of the turntable 2 is visible in FIG. 1. Correspondingly one must imagine a further tail wheel mounted rotatably on the machine part 10, beneath the plane of support of the workpiece material 3 in the machine part 10.

The machine part 10 is guided displaceably in the direction towards the workpiece material 3, on the machine frame 1, in a manner to be described later. In this way the saw band 4 can pass through the opening 6 of the clamping face 5 in the direction towards the workpiece material 3 and cut through the workpiece material, until the saw band 4 reaches the clamping jaw 8.

The feed direction of the saw band 4 is represented in simplified manner by the double arrow 12.

In known manner the saw band 4 is held on the machine part 10 above and below the support plane of the workpiece material 3 on the turntable 2 and pivoted into the cutting plane by band guides, the upper band guide 13 being visible in FIG. 1, which upper band guide can be arranged displaceably and settably on the machine part 10 in the direction of the double arrow 14, to match the cross-section of the workpiece material 3.

For the supply and removal of the workpiece material 3, roller tracks 15, 16 are placed before and after the machine stand 1.

The cutting plane of the saw band 4 is in the case of FIG. 1 perpendicular to the longitudinal direction of the workpiece material 3 and is given by a corresponding passage slot 17 within the turntable 2, which can be seen from FIG. 1 with its end at the stated point.

Figure 2:
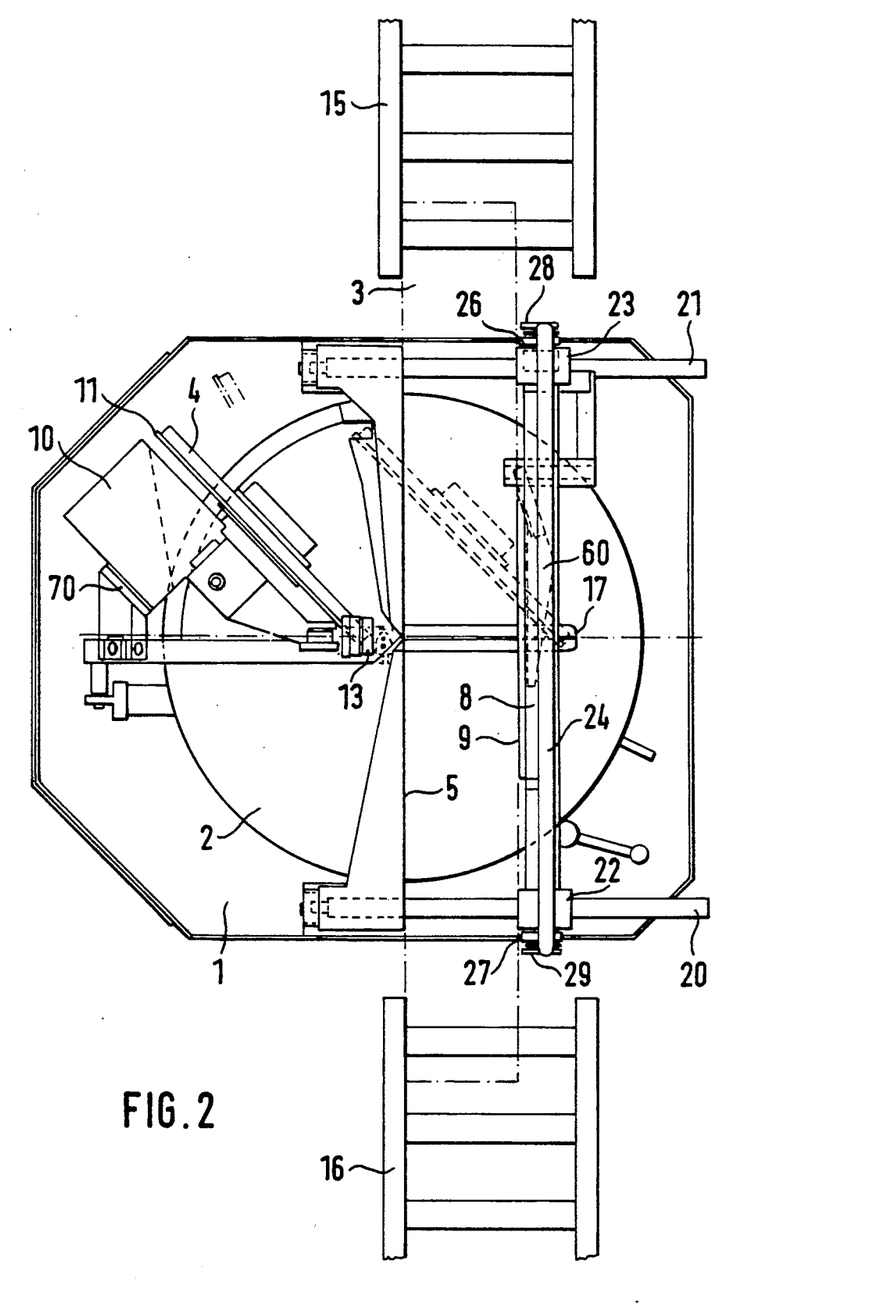
FIG. 2 shows a plan view of the machine according to FIG. 1 in an operational condition of the clamping jaw according to the invention.
Figure 3:
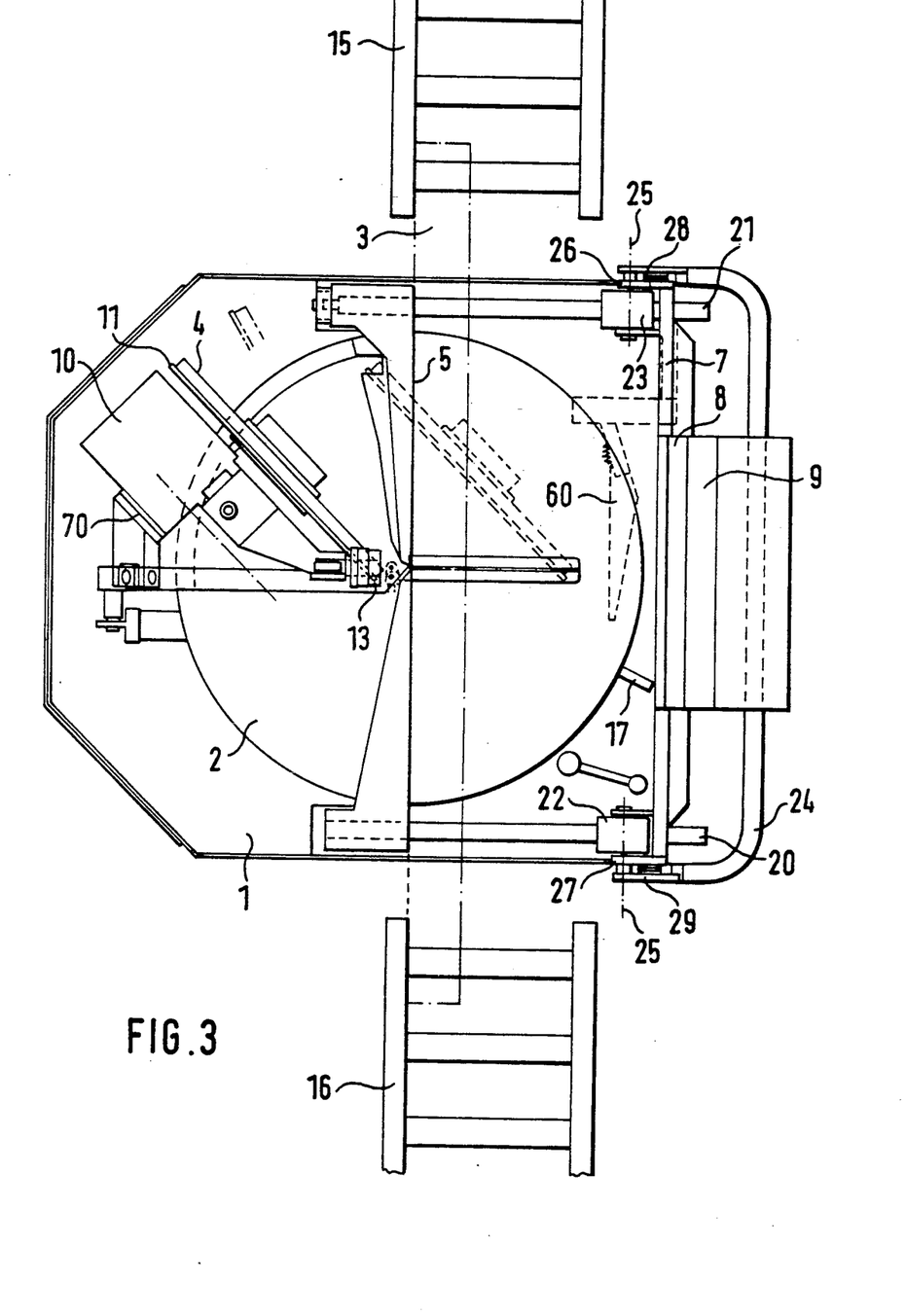
FIG. 3 shows a plan view of the machine according to FIG. 1 with another operational condition of the clamping jaw according to the invention.
Figure 4:
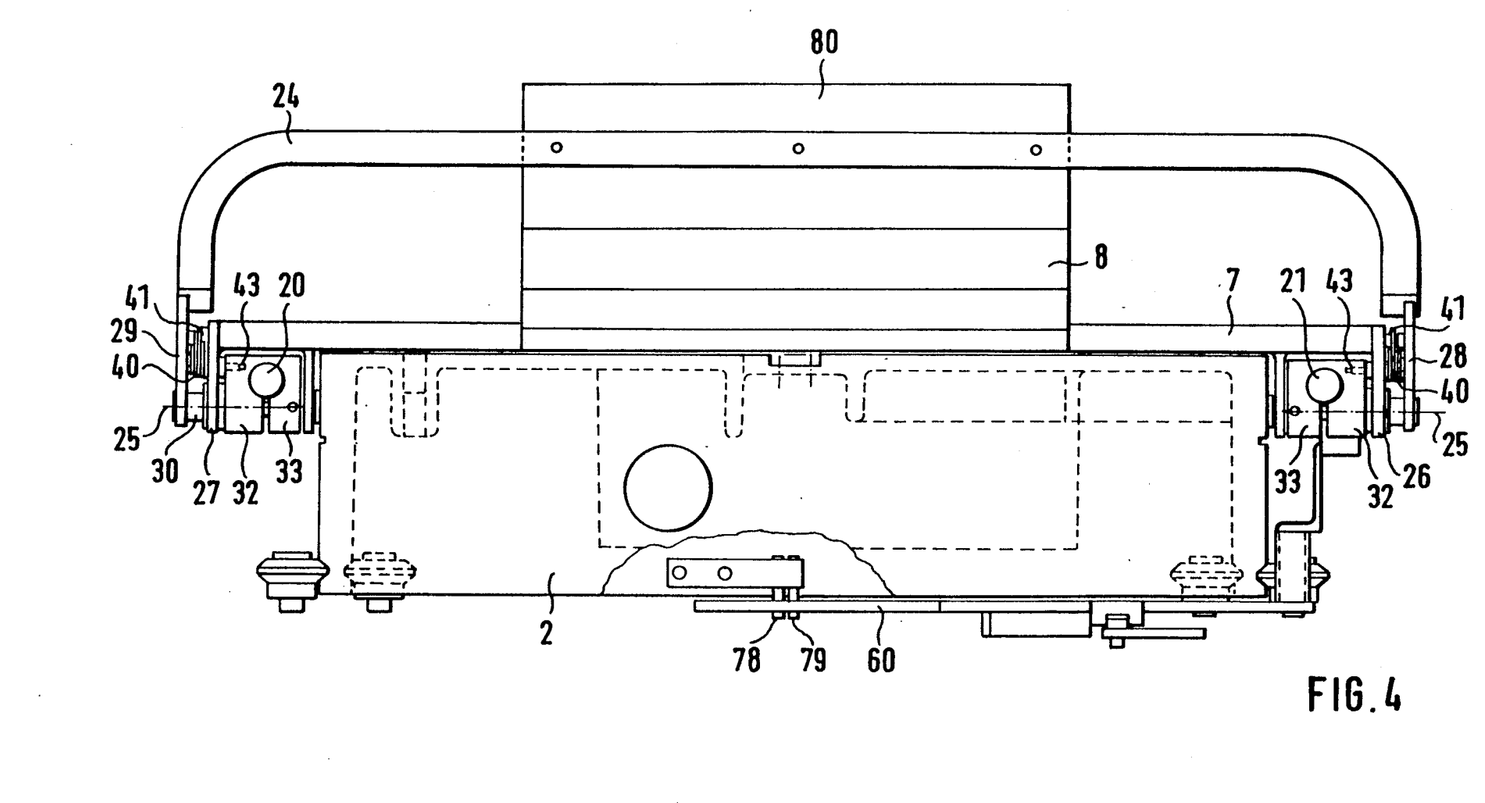
FIG. 4 shows a fragmentary front elevation of the machine according to FIGS. 1 to 3 concerning the clamping jaw according to the invention.

FIGS. 2 and 3 show these relationships again in plan view, disclosing especially the passage slot 17 within the turntable 2 more clearly.

Since the clamping face 5 is stationarily arranged, the clamping face 9 or the clamping jaw 8 which comprises it must be moved in the direction towards the workpiece material 3 for the clamping of the workpiece material 3 between the clamping faces 5 and 9, and clamped fast in relation to the workpiece material.

For this purpose the clamping bridge 7 is displaceable and securable on horizontal guides 20, 21 in the form of guide rods of circular cross-section which extend substantially transversely of the direction of the clamping face 5. This is effected by means of guide elements forming clamping blocks 22, 23 connected to the clamping bridge 7. These guide elements are clampable in relation to the guide rods and releasable as regards this clamping, by a curved hand grip 24 connected with the clamping bridge. Here by actuation of the curved hand grip about its tilt axis 25, at the same time on the clamping blocks 22, 23 a movement of the clamping bridge 7 and thus of the clamping jaw 8 takes place in relation to the workpiece material 3, as will be explained in greater detail below, especially by reference to FIGS. 4 to 8.

From the graphic illustration according to these FIGS. 4 to 8 it can be seen that the clamping bridge 7 is pivotably mounted about the tilt axis 25 by means of lateral members 26, 27 on the clamping blocks 22, 23. Likewise the curved hand grip 24 is mounted pivotably about the tilt axis 25, by means of side members 28, 29 arranged on its ends.

The tilt axis is formed by a clamping screw 30 mounted in each of the guide elements 22, 23 and nonrotatably connected in each case with the side members 28, 29 of the curved hand grip 24.

The clamping blocks 22, 23 displaceable on the guide rods 20, 21 comprise on their side facing the tilt axis 25 a notch 31 by means of which they may be clamped via the clamping screw 30 in relation to the guide rods 20, 21. For this purpose the clamping screws 30 are freely rotatably mounted on the side facing the side members 26, 28 in the clamping jaw 32 of the clamping blocks 22, 23, and are axially supported in the direction towards the other clamping jaw 33, while being mounted in this other clamping jaw by means of a threaded engagement 34.

This form of construction has firstly the effect that by pivoting actuation of the curved hand grip 24 through the side members 28 and the clamping screws 30 non-rotatably connected therewith, the clamping of the clamping blocks 22, 23 in relation to the guide rods 20, 21 may be established or released.

Now, the clamping bridge 7 is likewise rotatably mounted by means of its lateral members 26 on the clamping screws 30 and about the tilt axis 25, so that the basic adjustment which the clamping blocks 22, 23 receive on the guide rods 20, 21 is communicated to the clamping bridge 7.

In order now to effect a displacement of the clamping bridge 7 and thus of the clamping jaw 8 in the direction towards the workpiece material 3, in the sense of a clamping of the workpiece material in relation to the stationary clamping face 5, on each of the two sides, a clamping arrangement is provided which is formed by a toggle lever constituted of two articulatedly interconnected arms 40, 41. The arms are rotatably connected with the clamping bridge at 42 with the end of its arm 41, while the other arm 40 is rotatably articulated at 43 to the respective guide element 22, 23. (In this connection see especially FIGS. 5 to 7).

Figure 5:
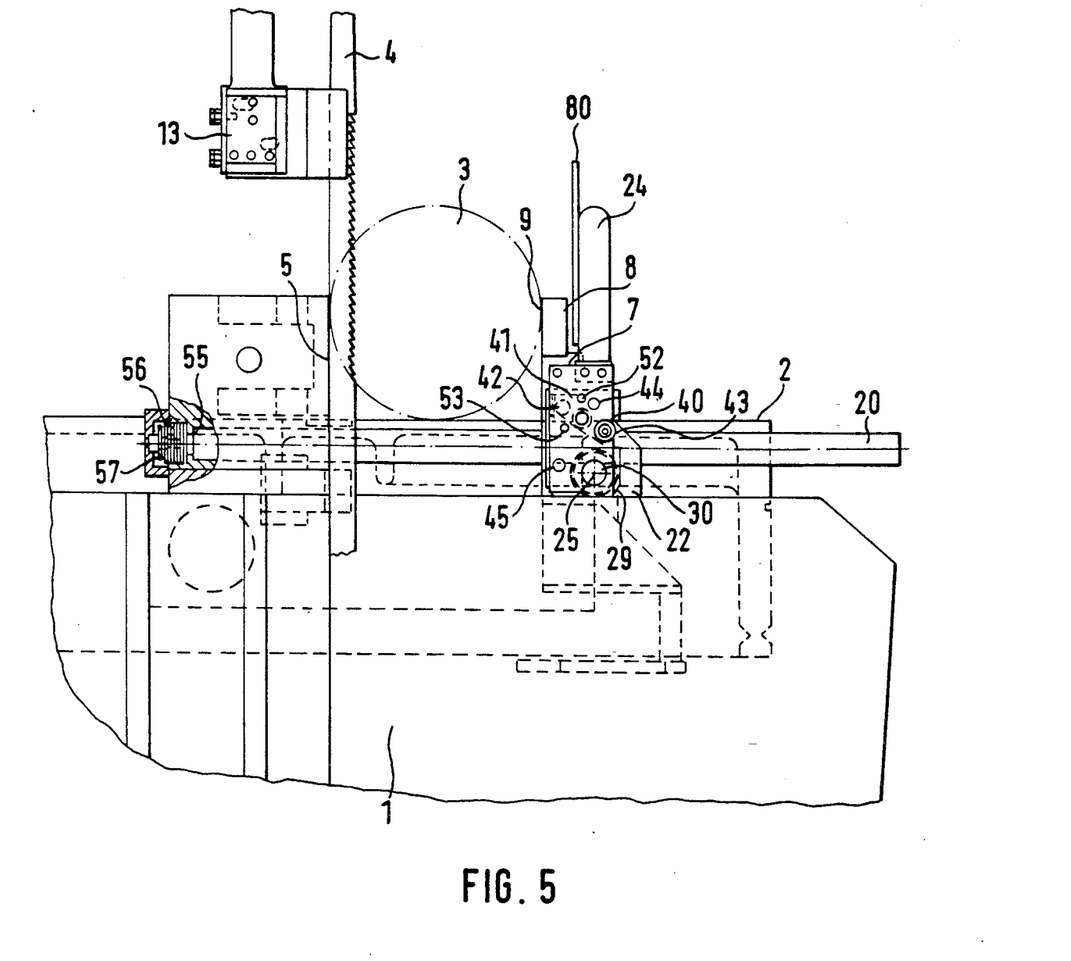
FIGS. 5 to 7 show fragmentary lateral elevations of the machine according to FIGS. 1 to 4, in the region of the clamping device.
Figure 6:
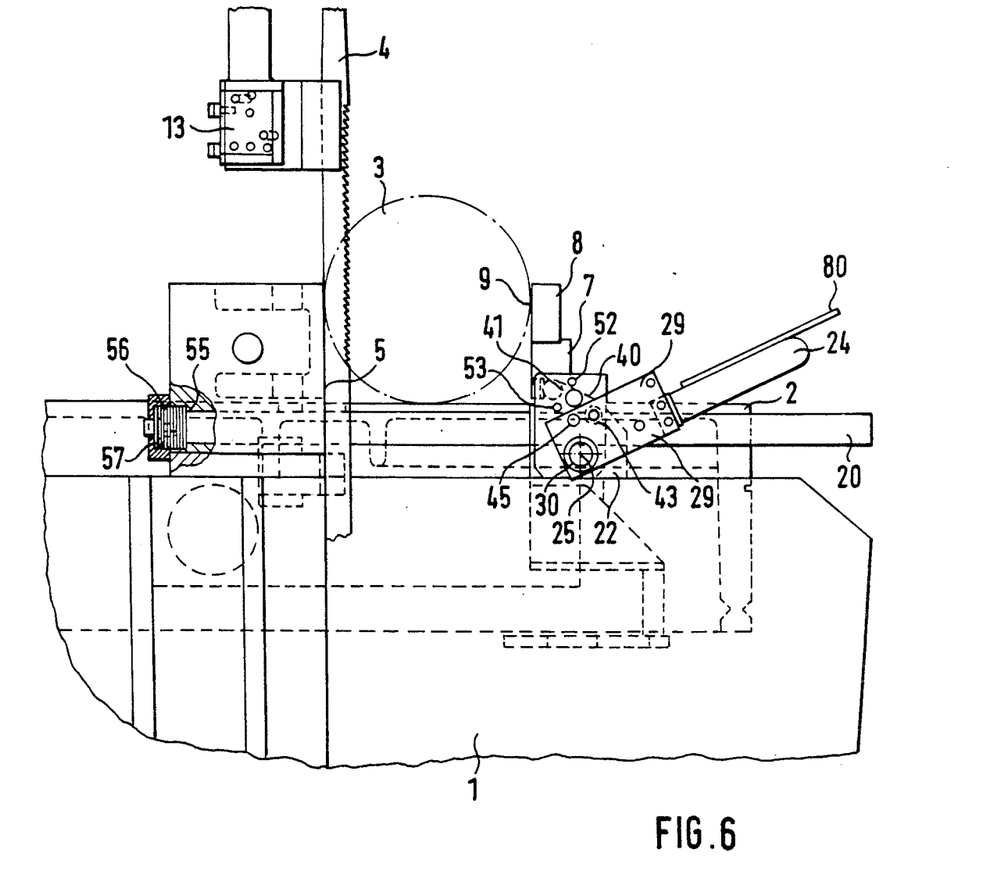

The pivoting movement of the clamping bridge 7 about the tilt axis 25 thus leads to a movement of the toggle lever 40, 41 between its extended position, visible from FIG. 5, and its folded position, visible from FIG. 6, the transfer of the toggle lever between these positions being effected by stops 44, 45 which, starting from the side members 28, 29 of the curved hand grip 24, extend into the range of movement of the arm 41 of the clamping arrangement formed by the toggle lever and move the latter to and fro between the extended position of the toggle lever and its retracted position, according to the pivoting movement of the curved hand grip 24. Here the vertical position of the curved hand grip 24 corresponds to the extended position of the toggle lever 40, 41 according to FIG. 5. The clamping position of the clamping jaw 8 against the workpiece material 3 likewise corresponds thereto.

If by tilting of the curved hand grip 24 out of the position shown in FIG. 5 into the position visible in FIG. 6 the side members 28, 29 connected each with the hand grip 24 are also pivoted, then the stop pin 45 connected therewith takes the toggle lever arm 41 with it, whereby the toggle lever is deflected out of its extended position into a folded position in which the clamping jaw 8 comes free from the workpiece material 3, in that now by means of its side members 26, 27 it can pivot about the tilt axis 25 away from the workpiece material 3.

The mechanism as described thus provides the possibility, by movement of the curved hand grip 24, of releasing the clamping of the clamping blocks 22, 23 in relation to the guide rods 20, 21, in order to displace the guide blocks on the guide rods, whereby at the same time a corresponding displacement of the clamping jaw 8 takes place, determined by the cross-section of the workpiece material.

Moreover by appropriate movement of the hand grip 24 with positioning of the clamping jaw 8 set to the workpiece material then the clamping of the workpiece material 3 in relation to the clamping face 5 can take place.

Figure 8:
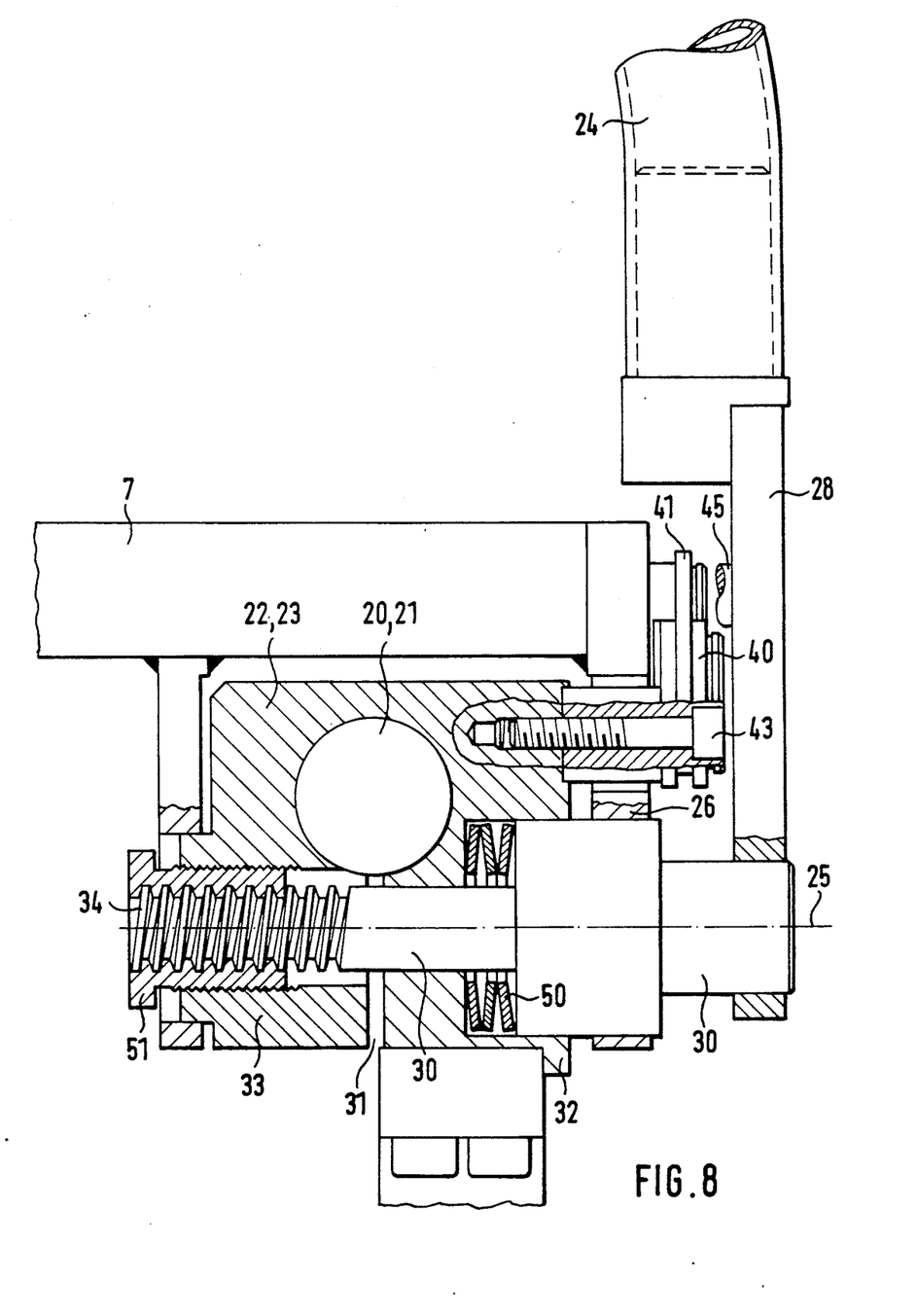
FIG. 8 shows a sectional view of one side of the clamping device according to the invention along the section line VIII—VIII in FIG. 5.

As may be seen especially from FIG. 8, the axial supporting of the clamping screw 30 in relation to the clamping jaw 32 can be effected by way of a spring pack 50, in order to prevent overstressing or excessive clamp stressing of the clamping screw 30, without the clamping force which is necessary between the clamping jaws 32, 33 being thereby impaired.

Likewise for the basic setting of the clamping screw 30 a threaded sleeve 51 may be seen from FIG. 8, in the vicinity of the threading 34, which sleeve is adjustable by a threading within the clamping jaw 33.

Figure 7:
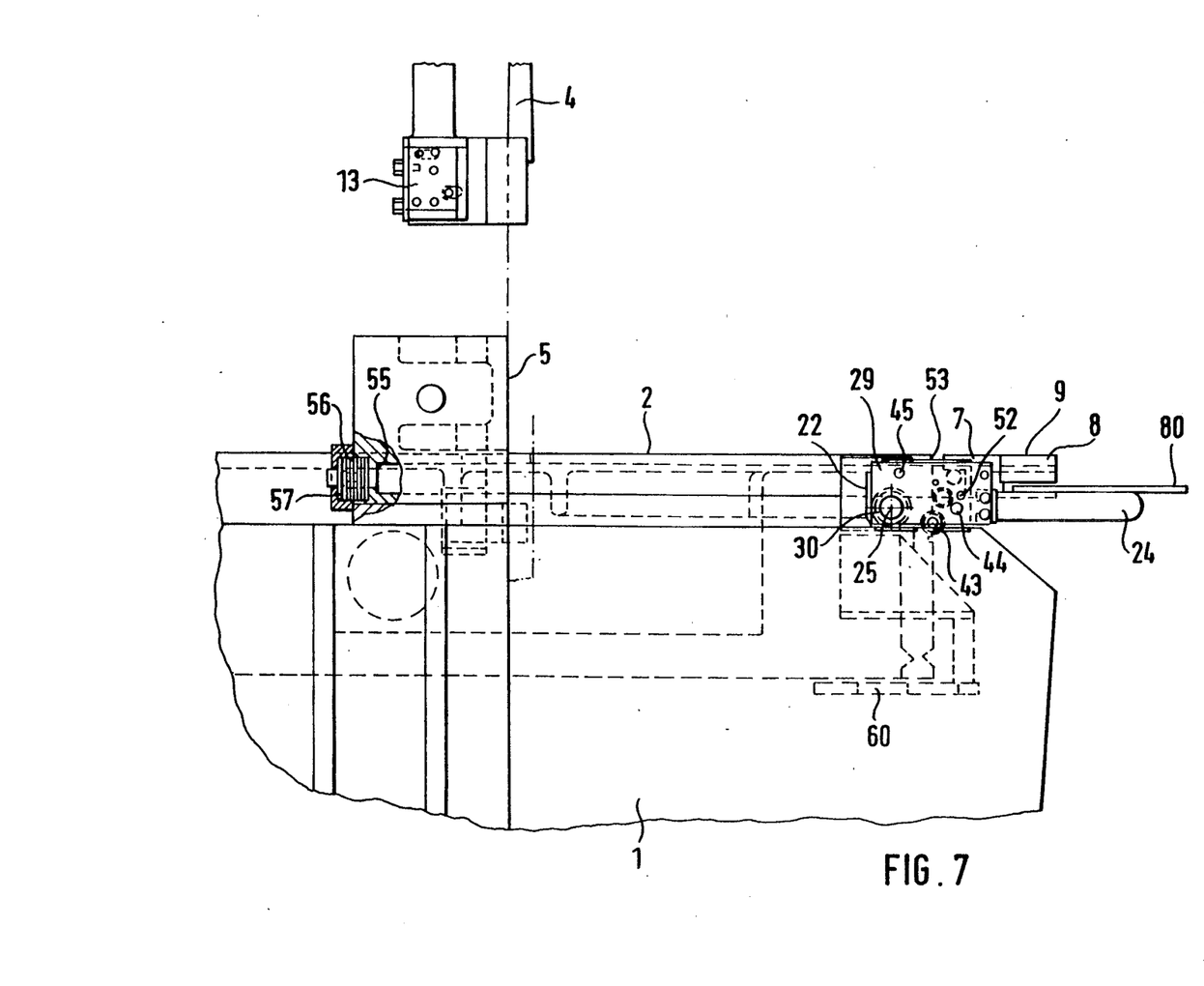

The stops 44, 45 by which the clamping arrangement formed by the toggle lever 40, 41 is movable between its operative positions were explained especially by reference to FIGS. 5 to 7. So that the clamping arrangement cannot assume any position overstepping the desired control positions, the side members 26, 27 are connected with stop pins 52, 53 which limit the pivoting range of the arm 41 of the toggle lever 40, 41 to the desired degree.

As already described above and as illustrated by FIG. 7, now the clamping bridge 7 and thus the clamping jaw 8 can also be pivoted out of the normal working range about the tilt axis 25. For this purpose it is necessary and possible to release the pivot axis 43 of the arm 40 of the toggle lever, which is constituted by a bolt (see FIG. 8). Then the clamping bridge 7 can be pivoted, without hindrance by the toggle lever 40, 41, about the tilt axis 25 into the position which may be seen from FIG. 7, in which the clamping face 9 of its clamping jaw 8 constitutes a completion of the surface of the turntable 2, so that workpiece material can be laid on the machine bench and moved, in the freehand process, without detriment by the clamping device.

According to the circumstances of the individual case, if the clamping of the clamping blocks 22, 23 is too closely positioned on the guide rods 20, 21 in relation to the workpiece material, the clamping of the workpiece material 3 in the manner as visible from FIGS. 5 and 6 may cause excessive clamping forces. In order to counteract this the guide rods 20, 21 are axially displaceably mounted on the machine frame 1 and stressed against stops 55 by spring packs 56, which are counter-supported for the one part on the stops 55 and for the other part on support plates 57 of the guide rods 20, 21.

In this connection FIG. 5 shows the spring pack 56 in the clamped condition, while FIG. 6 correspondingly to the condition of the clamping bridge 7 reproduces the spring pack 56 in the relaxed condition.

The Figures also show an operation arm 60 extending substantially horizontally on one of the guide elements 23, which operating arm may be pivotably articulated to this guide element. This operating arm amy then be appropriately equipped with operating elements for feed motion limitation or feed motion reversal for the machine part 10.

Likewise however the possibility also exists of arranging the operating displaceably with the guide element 23, but otherwise stationarily on the guide element so that the machine part runs against the operating arm during advance of the saw band.

In both cases the following is valid: When the saw, on appropriate advance of the saw band, has effected the severance of the workpiece material, it reaches a position pre-determined by the setting of the clamping bridge 7, which position also recurs for another part in the operating arm 60. If now the machine part 10 runs with a corresponding section against the operating arm 60, then this can effect the halting of the feed motion and the return of the machine part 10, in which, as stated, the reversal position in each case is set by reason of the cross-section of the workpiece material and the setting of the clamping bridge 7 at the same time, which is involved therewith.

For running against the operating arm 60 the machine part 10 is equipped, on both sides of the saw band 4, with stop pins 78, 79 (see especially FIGS. 4 and 9), which ensure that for every possible mitre setting of the cutting plane 17 of the saw band 4 a collision of the saw band with the clamping jaw 8 is avoided. Some cases which are conceivable in this sense are visible in chain-line form from the illustration according to FIG. 11 where, starting from the solid-line illustration of the cutting plane 17 and the associated abutment positions of the stop pins 78, 79 with the operating arm 60, pivot angles of the cutting plane going to both sides are represented.

FIG. 9 shows yet again the vertical band saw, as described in detail hitherto, in lateral elevation approximately in accordance with FIG. 5, the machine part 10 being shown in the position at the beginning of the sawing action and at the end of the sawing action.

Figure 9:
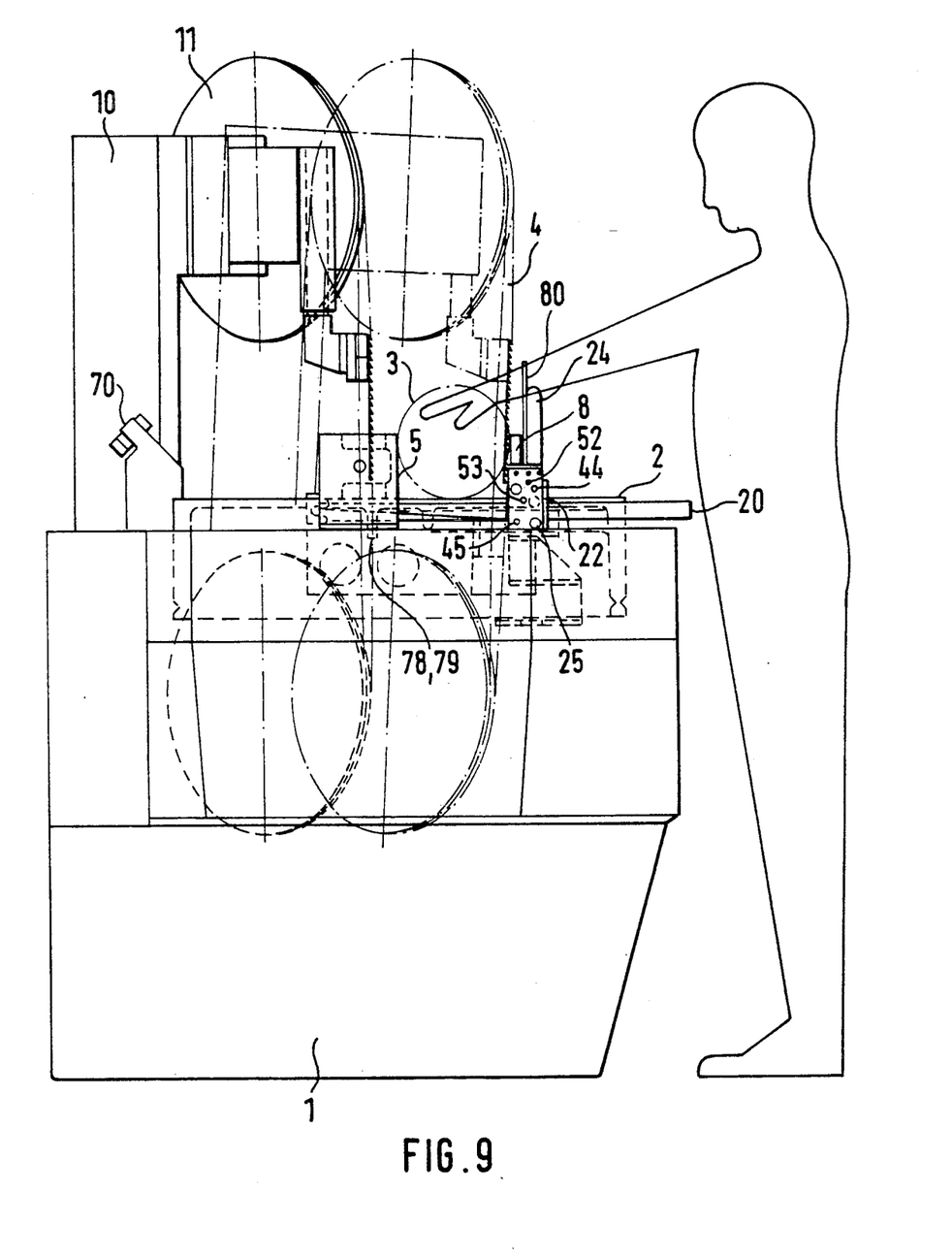
FIG. 9 shows an overall lateral elevation of the machine according to FIG. 1, in different operational conditions of the saw band and FIGS. 10 and 11 each show a plan view of the machine according to FIG. 1 with different pivotal positions of the saw band and the cutting plane connected with the saw band.

As may be seen, the machine part 10 can be tilted somewhat in the feed direction with the aid of a tilting device 70, with which the machine part 10 can be pivoted about an axis arranged on its horizontal guide.

Figure 10:
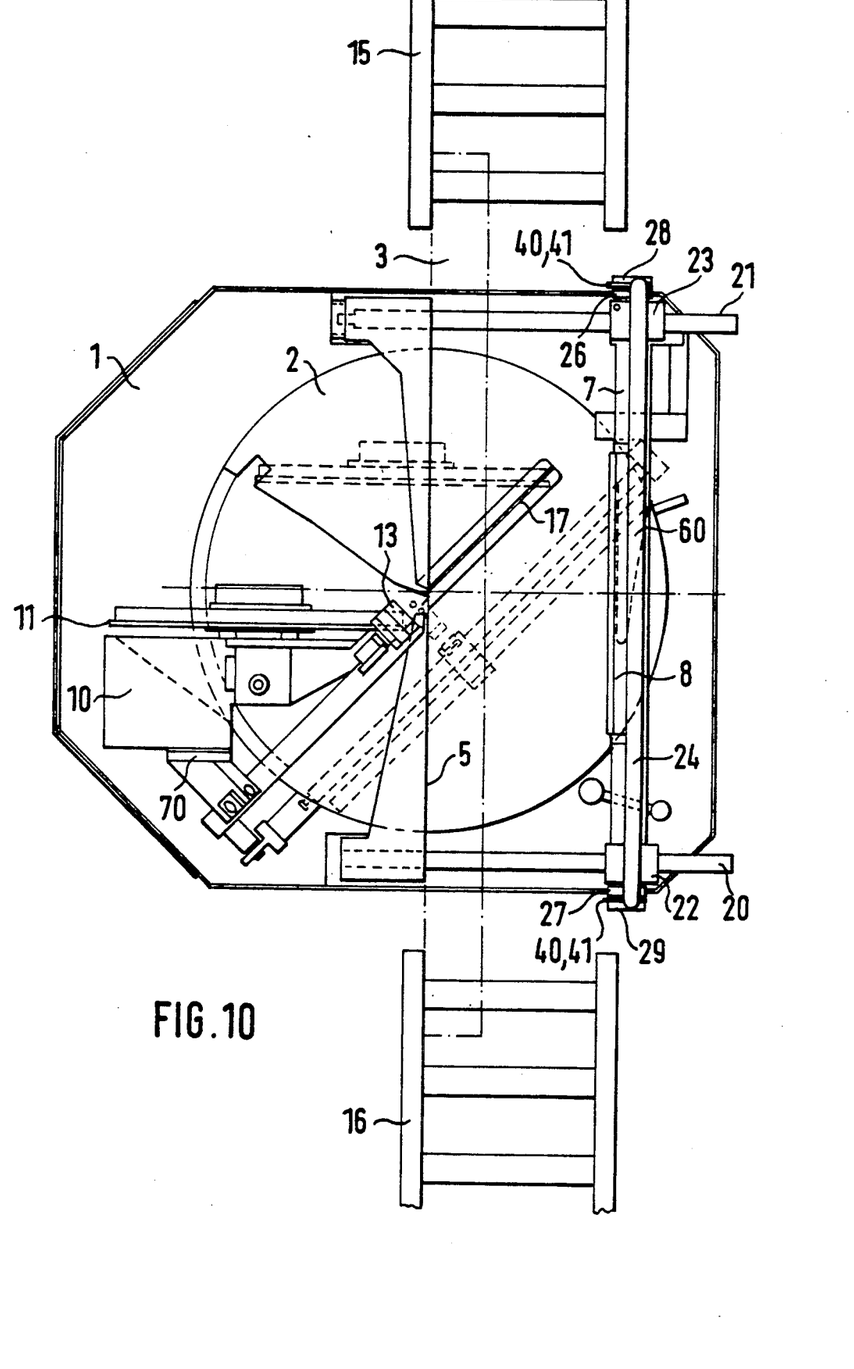
Figure 11:
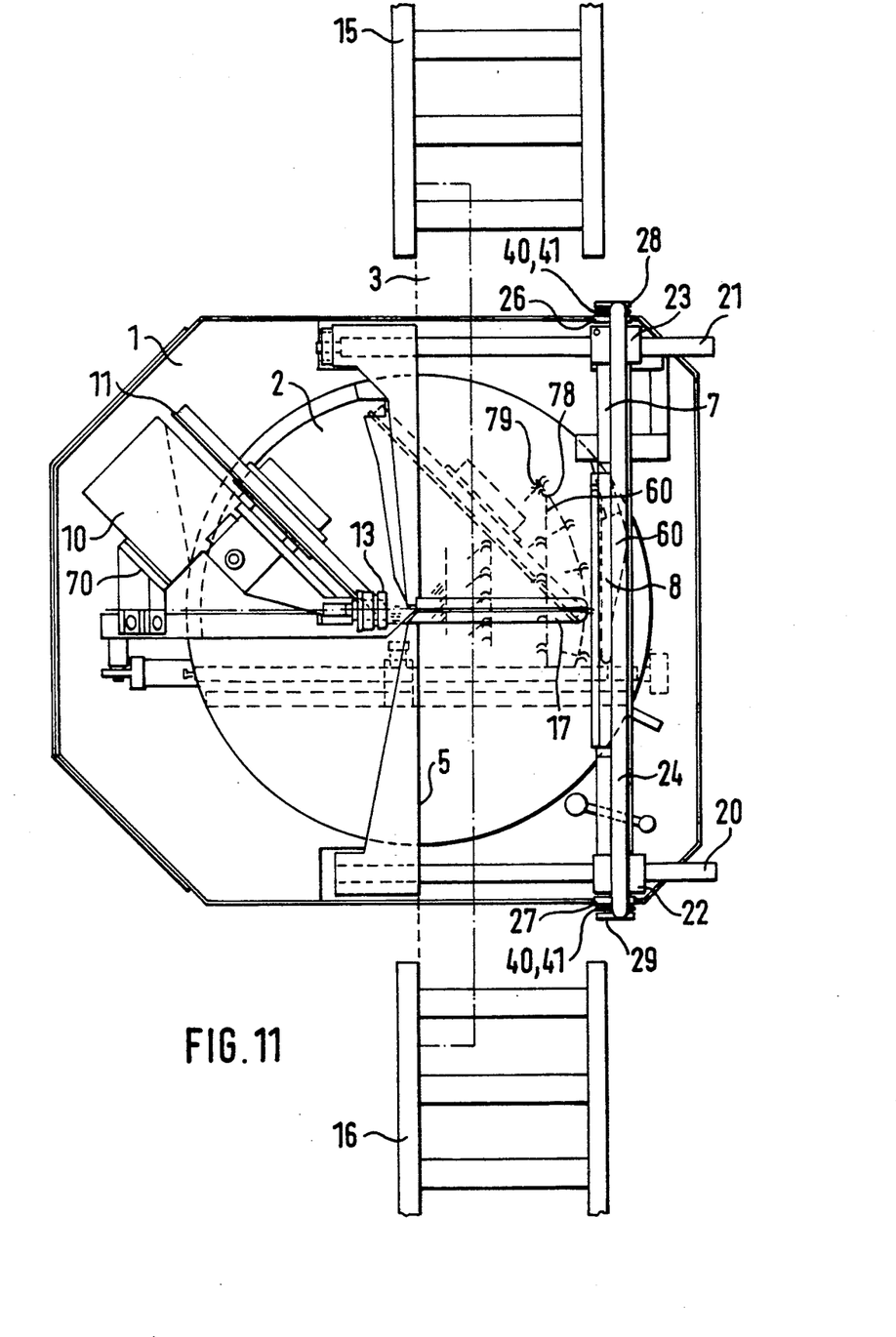

Likewise FIGS. 10 and 11 show the vertical band saw in plan view in two different pivoted positions for a construction of the vertical band saw in which the machine part 10 is pivotable together with the turntable 2 about a vertical axis 71 visible from FIG. 1, in order to produce different mitre angles on the workpiece material 3. Thus FIG. 10 shows a mitre angle placed at approximately 45° to the feed motion of the workpiece material 3, while FIG. 11 illustrates a cutting direction placed transversely of the workpiece material, together with different settings of the operating arm 60 required by the cross-section of the workpiece material.

Finally all Figures show that the curved hand grip 24 is equipped at its middle with a "Plexiglas" pane 80 which makes the working zone of the saw band safe against reaching in by the operator, while on the other side there is a facility for the operator to look into the working region of the saw band.

For this purpose the "Plexiglas" pane 80 is formed so that it projects upwardly beyond the curved hand grip 24 in the working region of the saw band 4 so that there the curved hand grip cannot be grasped by the operator. Moreover the "Plexiglas" pane 80 is extended beneath the curved hand grip so far that it gaplessly adjoints the clamping jaw 8. On the other hand this "Plexiglas" (TM) pane 80 is not in the way when, as may be seen for example from FIG. 7, the clamping device is brought out of the surface region of the machine bench for freehand sawing.

Various changes and modifications may be made and any features described herein may be used with any others within the scope of the inventive concept.

We claim:

1. A system for clamping a workpiece (3) on a saw table (2) of a saw (4) operable in a sawing plane, optionally, a vertical band saw,
said system comprising
means (5) forming a fixed, substantially planar vertical clamping face (5) for the workpiece, arranged essentially transversely to a feed direction of the saw (4);
a movable clamping jaw (8) having a movable clamping face (9) displaceable horizontally toward and away from said fixed clamping face (5), said movable clamping face extending substantially vertically and being essentially parallel to said fixed clamping face,
wherein in accordance with the invention,
the movable clamping jaw (8) is formed as an elongated clamping bridge (7) having end portions and which extends over the saw table (2);
the fixed clamping face (5) extends over the saw table (2) and is formed with a passage for the saw (4);
means (20, 22; 21, 23) are provided for guiding the end portions of the clamping bridge (7) in a horizontal guide path and for adjustably securing said clamping bridge,
said guide means being located adjacent the saw table and extending perpendicularly with respect to the plane of the fixed clamping face (5),
wherein the clamping bridge (7) is tiltably retained on said guide means for tilting about a tilt axis (25), which tilt axis extends parallel to the movable clamping face (9);
wherein a locking and tilt clamping means (40, 41) including a handle means (24, 28, 29) is provided, coupled to said guide means (22, 23) and the end portions of the clamping bridge (7) for selective clamping of said clamping bridge in respective adjustment positions, including
a first or clamped position of the clamping means (40, 41), wherein the clamping bridge (7) is positioned against the workpiece (3) to define a clamped condition thereof, and
a second or released position of the clamping means, wherein the clamping bridge (7) is tilted away from the workpiece and defining a released condition to permit movement of the workpiece with respect to said table (2).

2. The system of claim 1, wherein each clamping means is formed by a toggle lever (40, 41) which includes at least two rotatably interconnected lever arms (40, 41) defining free ends; and
wherein the free ends of the lever arms are rotatably connected (43) with the guide means (22, 23) and with the end portions (42) of the clamping bridge, respectively.

3. The system of claim 2, further comprising pins (44, 45) coupled to said handle means (24, 28, 29) and engaging the toggle levers (40, 41) for, respectively, moving the toggle levers between an extended and a released position.

4. The system of claim 2, wherein said toggle levers have a range of movement; and
said system further including stop means (52, 53) for presetting the pivotable positions of the toggle levers (40, 41) between, respectively an extended and released, and an unextended position and limiting the positions of said toggle levers, said stop means projecting from a region adjacent the end portion of the clamping bridge, and extending into the range of movement of the toggle levers.

5. The system of claim 2, wherein said toggle levers are releasably coupled to said guide elements (22, 23).

6. The system of claim 5, wherein the guide means (20, 21) for the clamping bridge (7) are positioned beside the saw table (2) and beneath a surface of said table; and
wherein the clamping bridge, upon release of the toggle levers from the guide means (22, 23) is pivotable about said tilt axis (25) into a position in which its clamping face (9) lies in a surface essentially coplanar with the surface of the saw table (2).

7. The system of claim 1, wherein the guide means (20, 21, 22, 23) include
guide rails (20, 21) and at least two guide blocks (22, 23), said guide blocks reaching around said guide rails, said guide rails extending horizontally and perpendicularly to said clamping faces (5, 9);
said guide blocks (22, 23) are formed with slots parallel to said guide rails on a side of the tilt axis (25) to form said clamping jaws (32, 33); and
clamping screws (30) are located coaxially with said tilt axis, and rotationally fixed to the handle means (24, 28, 29) for relesably clamping the guide blocks on the guide rails, which rails and rail clamping jaws (32) are freely rotatable with respect to each other, said clamping screw extending from a first one of said rail clamping jaws to a second rail clamping jaw.

8. The system of claim 7, including a threaded sleeve (51) axially adjustable in the second rail clamping jaw and forming rotatable mounting means for rotatably mounting the clamping screws (30).

9. The system of claim 7, further including spring elements (50) interposed between the clamping screws (30) and the rail clamping jaws, and positioned adjacent the handle means (28, 29) to form an axial support for the clamping screws.

10. The system of claim 1, wherein the handle means (24, 28, 29) are pivotable about a pivot axis parallel to said tilt axis (25), said pivot axis, optionally, coinciding with the tilt axis.

11. The system of claim 1, wherein said handle means (24, 28, 29) further include a curved hand grip extending parallel to said clamping bridge.

12. The system of claim 1, wherein the clamping bridge (7) extends over the guide means (22, 23);
side members (28, 29) are provided on said bridge, arranged on end portions of the bridge and extending parallel to the guide means (20, 21); and
the tilt axis (25) passes through said side members.

13. The system of claim 1, wherein the saw is a vertical band saw (4);
wherein the guide means includes guide elements (20, 21) said guide elements optionally comprising guide rods or rails (20, 21);
and wherein said guide elements are coupled at least indirectly to a machine frame of said vertical band saw.

14. The system of claim 13, wherein said guide elements (20,21) are axially displaceably mounted on the machine frame (1) for axial displacement with respect to their longitudinal extent; and
stop means (55) are provided, secured on the machine frame and extending in a direction away from the clamping jaw, defining an abutment.

15. The system of claim 14, including adjustable spring means (56) resiliently retaining said stop means.

16. The system of claim 1, comprising a substantially horizontally extending safety and switching arm (60), for limiting feed motion and optionally stopping of the saw;
said safety and switching arm (60) extending in the region formed by feed movement of the saw (4), when the saw is moved towards the workpiece.

17. The system of claim 16, wherein the saw is vertical band saw having a saw band (4), said saw comprising a frame (10); and
stop pins (78, 79) are provided, located on both sides of the saw band in a position for engagement by said switching arm (60).

18. The system of claim 16, wherein said safety and switching arm (16) is pivotably secured to one of the guide means (23).

19. The system of claim 1, wherein said locking and tilt clamping means permits detaching the clamping bridge (7) upon tilting said clamping bridge.

20. The system of claim 1, wherein replaceable wearable face elements, optionally comprising an aluminum element, are provided, said face elements being secured to said movable clamping jaw and defining said movable clamping face (9).

21. The system of claim 1, wherein the handle means (24, 28, 29) are pivotable about a pivot axis parallel to said tilt axis (25), said pivot axis, optionally, coinciding with the tilt axis and include a curved handgrip (24); and
further including a guard plate (80) essentially centrally secured to the curved hand grip (24), and extending parallel to the movable clamping face of the movable clamping jaw (7), said guard plate projecting upwardly beyond the curved hand grip (24).

* * * * *